ASYNCHRONOUS TO SYNCHRONOUS TWO-PHASE CLOCK SYSTEM

Filed Sept. 21, 1964 2 Sheets-Sheet 1

INVENTORS
ALAN R. HATCH
ROBERT S. RIOS
BY [signature]
[signature]
ATTORNEYS

INVENTORS
ALAN R. HATCH
ROBERT S. RIOS
BY
ATTORNEYS

United States Patent Office 3,337,810

Patented Aug. 22, 1967

3,337,810

ASYNCHRONOUS TO SYNCHRONOUS TWO-PHASE CLOCK SYSTEM

Alan R. Hatch, La Jolla, and Robert S. Rios, San Diego, Calif., assignors to the United States of America as represented by the Secretary of the Navy Filed Sept. 21, 1964, Ser. No. 398,133
1 Claim. (Cl. 328—63)

ABSTRACT OF THE DISCLOSURE

Some digital processing equipment, such as Nand-Nor elements, require two clock pulses, namely a phase 1 and then a phase 2, in that order. Here, logic circuits are provided for normally closing inhibiting gates between a two-phase clock generator and Nand-Nor equipment except only for the duration of the first complete pair of clock pulses immediately following the arrival of the asynchronous information pulse.

The invention described herein may be manufactured and used by or for the Government of the United States of America for governmental purposes without the payment of any royalties thereon or therefor.

This invention relates to clock control circuits for digital computer-type equipment and is particularly directed to interface equipment between the two-phase clock generator and the equipment to be driven.

The system of this invention is to allow counters and shift-registers, requiring a two-phase clock pulse source for operation, to be operated under the control of random asynchronous pulse timing signals or "gate" pulses from other equipments. Nand or Nor logic systems are examples of digital equipment requiring two phase clock pulses for operation. Several factors compound the difficulty of properly operating the Nand or Nor equipment from a two-phase clock source. First, the control or signal pulse for initiating operations may be random or unsynchronized with respect to the clock. Second, the two phases, $\phi_1$ and $\phi_2$, of the clock must be applied to the Nand-Nor equipment in the proper sequence. That is, phase 1 and then phase 2, not phase 2 and then phase 1, must be applied to properly operate the Nand-Nor logic circuit. Next, one pair only of pulses must be passed to the Nand-Nor circuits in response to each control or signal pulse, even though the clock source runs continuously.

The object of this invention is to provide simplified logic circuits for randomly applying two-phase clock pulses to equipment requiring two-phase clock operation.

To attain the object of this invention inhibiting gates are connected, respectively, between the phases, $\phi_1$ and $\phi_2$, of the synchronous clock generator and the two inputs of the Nand-Nor equipment to be operated. The inhibiting gates are normally open circuited to block the passage of the clock pulses in response to an inhibiting voltage normally applied to the control electrodes of the gates. The two-phase voltages are continuously applied to the other input electrodes of the gates. Means is provided for removing the inhibiting voltage just before the commencement of the phase 1 pulse following the pair of pulses during which the asynchronous control pulse arrives. After one pulse of each phase passes, the logic circuit is locked up to prevent the passage of additional phase pulses until after a new asynchronous control pulse arrives.

Other objects and features of this invention will become apparent to those skilled in the art by referring to the description in the following specification of the preferred embodiment shown in the accompanying drawings in which.

The digital equipment 10 is of the type which must have two-phase timing pulses to operate properly. The two phases, $\phi_1$ and $\phi_2$, must be applied to the equipment in that order. The synchronous clock generator 11 is continuously running and its output may, for example, comprise a transformer with a center tapped secondary winding 12 to provide the out-of-phase pulses in succession. The two phase pulses may be of a type shown on the top two lines of FIG. 3, it being assumed the logical "0" volts of the pulses are required to operate the circuits. It is contemplated that the frequency or pulse repetition rate may be quite high, such as one or more megacycles per second. Control or signal pulses are received from the asynchronous source 14. A control pulse may arrive at any random time with respect to the synchronous clock generator pulses and must admit a signal pair of the phase pulses to the equipment 10.

Figure 1:
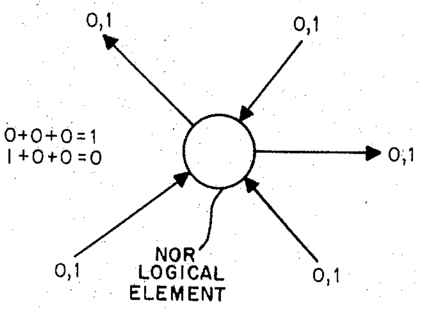
FIG. 1 is a schematic view of a Nor logic element.

In FIG. 1 is shown a Nor logic element which is simply a circle with arrows indicating input and output conductors. If all inputs to the element are logical "0," the output of the element is a logical "1," and if any one or more inputs is a logical "1," the output is a logical "0."

The two phase terminals of the synchronous generator are, respectively, connected to the controlled equipment 10 through inhibiting gates M and N. The inhibiting gates normally prevent the passage of the synchronous phase pulses, the control electrodes being connected together and to the output of logic element D.

Figure 2:
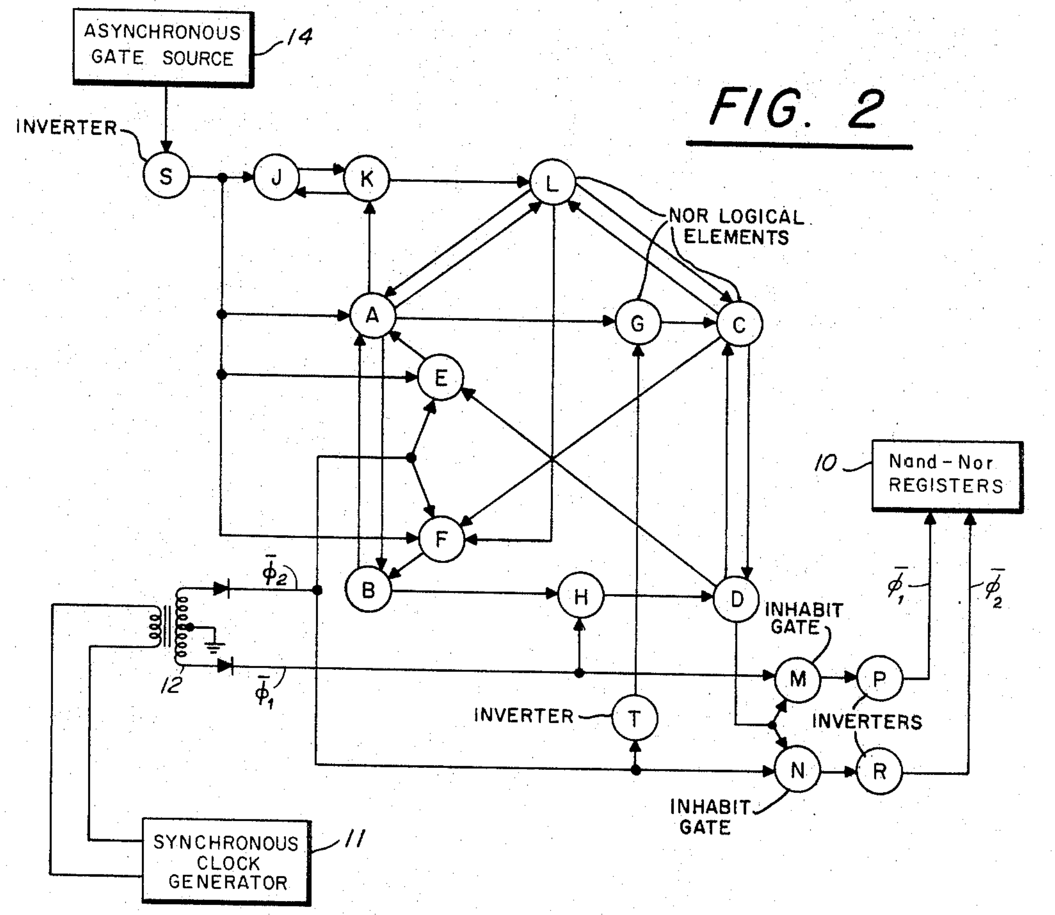
FIG. 2 is a schematic diagram of the logic circuits of the control system of this invention.

If the asynchronous control signal arrives as a logical "1," when the device of FIG. 2 is to put out a pair of clock pulses, the signal must be inverted by S. If the control signal comes in as a logical "0," S is not required. As will appear, the outputs from said elements, P and R, will remain at logical "1" until an asynchronous gate pulse from 14 arrives.

Figure 3:
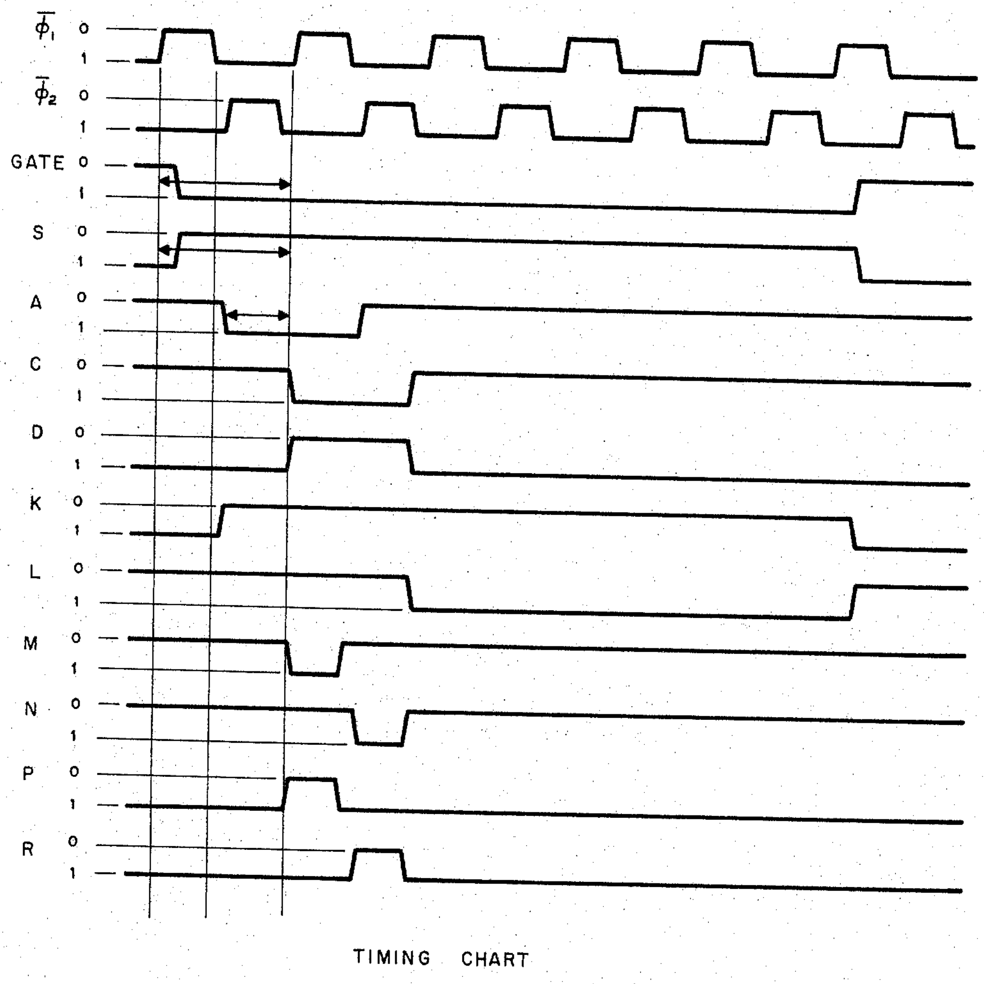
FIG. 3 is a timing chart of the essential voltages in the system of FIG. 2.

The output voltages of its principal logic elements of FIG. 2 are plotted in the timing chart in FIG. 3, along with the $\phi_1$ and $\phi_2$, inputs and the "gate" signal input. The two-headed arrows across the leading edges of the gate pulses, and S indicate the time span during which the leading edge of these signals may occur with respect to one complete cycle of the free-running two-phase clock. It will be noticed that in any case the output of P and R is unchanged in time. That is, the pair of output pulses from P and R always occur after the previous pair of clock intervals during which the gate pulse of 14 arrives. It will also be noticed, according to FIG. 3, that once the output of L is a logical "1," after phase 2 from R occurs, no further outputs from the device can occur during this gate period. L is returned to output a logical "0" at the end of the "gate," when K is reset to output a logical "1."

The control gate from the asynchronous source 14 must, as stated, arrive during either phase 1, $\bar{\phi}_1$, or phase 2, $\phi_2$, of the synchronous clock. If the control pulse arrives during phase 1 the following events occur in the specific logic network of FIG. 2 as follows: The lettered elements A and B and C and D, of FIG. 2 may be thought of as a binary counter. In reading the circuits of FIG. 2, the logic of the elements suggested in FIG. 1 will be used where it is assumed, as stated, that if all of the inputs of a circle are logical 0 the output or outputs will contain a logical 1 whereas if one or more of the inputs is 1 the logical output voltage of the element is 0. Assume now that a gate pulse from 14 arrives during phase 1, or while $\phi_1$ is 0. At this time $\phi_2$ stands at 1, the output of inverter T is 0 and the output of G is 1. The S output is 0, A output is 1, B output is 0, C output is 0, D output is 1, E output is 0, F output is 0 and H output is 0. J output is 0, K output is 1 and L output is 0. Since the D output is 1 the M and N outputs are each 0 and the P and R outputs continue to stand at 1. The stable state of the flip-flop CD is reversed only at the beginning of the succeeding phase 1 pulse and then the inhibiting voltage applied to M and N from D is removed permitting the phase 1 and phase 2 pulses from the clock source 11 to pass through the gates M and N to P and R and hence to the input of the Nand-Nor registers 10.

If, however, the gate arrives during phase 2, the output of F is 1 and B is 0 while A and J are 1, and K and G output 0. H remains 0 while C output is 0 and D is 1, thus inhibiting the gates M and N. At the beginning of the first phase 1 pulse of the succeeding pair of phase pulses after the arrival of the "gate" the flip-flop CD is reversed and the inhibiting voltage is removed from M and N and the succeeding pair of pulses $\overline{\phi_1}$ and $\overline{\phi_2}$, are allowed to pass to the register 10. That is when the logical 0 of phase 1 of the succeeding pair arrives the following events occur. C and A each put out 1, B, E, F and G each put out 0, H puts out 1, J puts out 1, K and L each put out 0. Since D now puts out 0, the inhibiting voltage is removed and the gates M and N pass the phase pulses.

Then, when the 0 voltage of phase 2 of the succeeding pair arrives D and A put out 0; B, C and E put out 1; F, G and H put out 0; J puts out 1; and K and L put out 0. Inverter T, responding to $\phi_2$, causes G to put out 1, C to put out 0, and D to put out 1, thus inhibiting M and N before $\phi_1$ of the following pair arrives. When C equals 0 all inputs to L are 0 and L is 1, inhibiting F until J equals 0 and K equals 1, which cannot occur until the gate voltage becomes 1 again.

That is, FIG. 2 shows, in effect, a one stage binary counter with control logic such that the counter is locked up until after one complete count, or after return to its reset condition. Further, regardless of when the gate pulse arrives, during any one pair of phase pulses, $\phi_1$–$\phi_2$, the inhibiting voltage on M and N is maintained until the beginning of the next succeeding pair of $\phi$ pulses. After passage of this one pair of $\phi$ pulses through the gate devices M and N, the inhibiting voltage is reestablished and maintained until the next succeeding asynchronous gate, regardless of the delay of the next gate.

What is claimed is:

In combination;

a synchronous continuously running two phase clock generator for alternatingly generating in regular sequence on separate lines pulses of phase 1 and phase 2, a digital circuit of the type which is responsive to a pair of said clock pulses, when phase 1 and then phase 2 are received in that order at said digital circuit, an asynchronous information pulse source, means connected to said asynchronous pulse source and responsive to an information pulse for admitting to said digital circuit first said phase 1 clock pulse and then said phase 2 clock pulse, said means comprising, two inhibiting gates connected, respectively, between each phase output line of said clock generator and the input to said digital circuit for normally inhibiting the input of said phase pulses to said digital circuit, a flip-flop (CD) with the output circuit of one stage of the flip-flop being connected in multiple to the control terminals of said two inhibiting gates, said flip-flop being set and said output circuit holding said gate normally open circuited, logical circuit means, said circuit means being interconnected between said asynchronous information pulse source, both of the phase 1 and phase 2 lines of said synchronous two-phase generator, and said flip-flop, said logic circuit means being adapted to reset said flip-flop for the duration of any complete pair of phase 1 and phase 2 pulses, in that order, immediately succeeding the arrival of an asynchronous information pulse for admitting only said one complete pair of phase 1 and phase 2 pulses to said digital circuit.

References Cited

UNITED STATES PATENTS

| | | | |
|---|---|---|---|
| 3,163,772 | 12/1964 | Cray | 307—88.5 |
| 3,178,587 | 4/1965 | Meyer et al. | 307—88.5 |
| 3,212,009 | 10/1965 | Parker | 308—99 |

ARTHUR GAUSS, *Primary Examiner.*

B. P. DAVIS, *Assistant Examiner.*